United States Patent
Sudo (10) Patent No.: US 10,475,469 B2
(45) Date of Patent: Nov. 12, 2019

(54) ABNORMAL SOUND DETERMINATION APPARATUS AND DETERMINATION METHOD

(71) Applicant: HONDA MOTOR CO., LTD., Tokyo (JP)

(72) Inventor: Yui Sudo, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/354,813

(22) Filed: Mar. 15, 2019

(65) Prior Publication Data
US 2019/0295568 A1  Sep. 26, 2019

(30) Foreign Application Priority Data
Mar. 20, 2018  (JP) .................................. 2018-053564

(51) Int. Cl.
*H04R 29/00* (2006.01)
*G10L 25/51* (2013.01)
*G10L 25/18* (2013.01)

(52) U.S. Cl.
CPC .............. *G10L 25/51* (2013.01); *G10L 25/18* (2013.01); *H04R 29/00* (2013.01)

(58) Field of Classification Search
CPC .... H04R 29/00; H04R 29/001; H04R 29/002; H04R 29/003; H04R 29/004; H04R 29/005; H04R 29/006; H04R 29/008; G10L 25/18; G10L 25/51
USPC ........................ 381/56, 58, 86, 94.1–94.3, 80
See application file for complete search history.

(56) References Cited

U.S. PATENT DOCUMENTS

| | | | | | |
|---|---|---|---|---|---|
| 4,549,289 | A * | 10/1985 | Schwartz | ................. | G01H 7/00 369/53.1 |
| 5,551,298 | A * | 9/1996 | Rayment | ................ | G01M 7/025 73/579 |
| 6,101,432 | A * | 8/2000 | Her | ..................... | G01M 17/007 700/280 |
| 7,995,772 | B2 * | 8/2011 | Steinberg | ................. | G01H 3/00 381/94.3 |
| 8,885,848 | B2 * | 11/2014 | Takechi | .............. | G01M 13/028 381/56 |
| 10,101,242 | B2 * | 10/2018 | Lim | ........................ | G01H 13/00 |
| 2004/0190928 | A1 * | 9/2004 | Tsunoda | ............... | G01N 1/2202 399/91 |
| 2006/0140413 | A1 * | 6/2006 | Abe | ........................ | G10L 17/26 381/56 |

(Continued)

FOREIGN PATENT DOCUMENTS

JP          3101017          10/2000

*Primary Examiner* — Xu Mei
(74) *Attorney, Agent, or Firm* — Rankin, Hill & Clark LLP (57) ABSTRACT

In determining presence/absence of abnormal sound occurrence in a test object such as a vehicle immediately after completion of vehicle assembly, sound data of the test object during running on a rough test track is recorded and resolved into multiple frequency bands by time unit. The sound data resolved into multiple frequency bands by time unit is compared among the multiple frequency bands and correlation coefficients matrix values indicating strength of correlation between the multiple frequency bands n are calculated. Presence/absence of the abnormal sound occurrence is finally determined based on the calculated correlation coefficients matrix values.

18 Claims, 7 Drawing Sheets

(56) References Cited

U.S. PATENT DOCUMENTS

| | | | | |
|---|---|---|---|---|
| 2006/0171546 A1* | 8/2006 | Bungenberg | ........... | H04R 29/00 |
| | | | | 381/86 |
| 2013/0030818 A1* | 1/2013 | Yamamoto | .......... | G10L 19/0204 |
| | | | | 704/500 |
| 2014/0369509 A1* | 12/2014 | Fukamachi | ............. | G01S 13/93 |
| | | | | 381/56 |
| 2016/0379664 A1* | 12/2016 | Chen | ...................... | H04R 1/326 |
| | | | | 381/94.3 |

* cited by examiner

FIG. 4D $$r = \frac{s_{xy}}{s_x \times s_y}$$

$$= \frac{\frac{1}{n}\sum_{i=1}^{n}(x_i - \bar{x})(y_i - \bar{y})}{\sqrt{\frac{1}{n}\sum_{i=1}^{n}(x_i - \bar{x})^2} \times \sqrt{\frac{1}{n}\sum_{i=1}^{n}(y_i - \bar{y})^2}}$$

Sxy: COVARIANCE OF x, y
Sx: STANDARD DEVIATION OF x
Sy: STANDARD DEVIATION OF y
n: 2 VARIABLE DATA
Xi, Yi: INDIVIDUAL VALUE
x̄, ȳ: AVERAGE VALUE

FALLEN BOLT ROLLING ON
VEHICLE FRAME

FIG. 8B

FALLEN BOLT ROLLING ON
RESIN MATERIAL

FIG. 8C

RATTLING CONNECTOR LEFT
UNCONNECTED

FIG. 10

ABNORMAL SOUND DETERMINATION APPARATUS AND DETERMINATION METHOD

CROSS-REFERENCE TO RELATED APPLICATION

This application is based upon and claims the benefit of priority from Japanese Patent Application No. 2018-053564 filed on Mar. 20, 2018, the contents of which are incorporated herein by reference.

BACKGROUND OF THE INVENTION

Field of the Invention

This invention relates to an abnormal sound determination apparatus and an abnormal sound determination method, particular to a determination apparatus and determination method for determining abnormal sound immediately after completion of vehicle assembly.

Abnormal sound of a vehicle after completion of assembly is ordinarily inspected or tested by listening to whether abnormal sound in interior noise (inside passenger compartment) arising other than that occurs during ordinary running when an inspector causes the vehicle body to be forcibly vibrated by driving the vehicle on a rough road such as a Belgian block (cobblestone) road.

As implied by the foregoing, "abnormal sound" as termed here means noise that differs from interior noise during ordinary vehicle running, i.e., differs from regular engine sound, wind sound, road noise and other interior noises heard during ordinary vehicle running, and that is noise that normally should not occur in a properly assembled vehicle, such as detached bolt rolling sound, body squeaking, or loose connector rattling.

Since such inspection relying on a human inspector is affected by difference in hearing acuity among inspectors and heavy inspector workload, automatic abnormal sound determination not requiring human intervention is preferable. Japanese Patent No. 3101017 can be cited as one example. The reference approaches this issue by proposing a technology for determining (diagnosing) mechanical system malfunctioning from abnormal sound (irregular sound) arising from the mechanical system.

In the technology disclosed in the reference, sound arising from a mechanical system is recorded using microphone(s), the recorded sound is resolved into multiple frequency components using multiple preselected bandpass filters, the second order powers are calculated, and envelope of the second order powers is thereafter extracted using low-pass filters. Next, correlation of predetermined frequency components is determined and malfunction is discriminated based on strength of the determined correlation.

Although the aforesaid configuration of the reference determines malfunction from abnormal sound, accuracy of the determination is impaired when other components near the frequency band of the bandpass filters get mixed in during separation of the frequency components. In the case of unknown abnormal sound, however, frequency components cannot be properly selected beforehand and high-accuracy determination is therefore difficult. In addition, use of low pass filters makes accurate determination of instantaneous abnormal sounds, such as of falling objects, impossible.

SUMMARY OF THE INVENTION

An object of this invention is therefore to overcome the aforesaid problem by providing an abnormal sound determination apparatus and determination method adapted to accurately determine occurrence/nonoccurrence of abnormal sound, including unknown sound, in a test object.

In order to achieve the object, this invention provides in its first aspect an apparatus for determining presence/absence of abnormal sound occurrence in a test object, comprising: a test sound data recording unit configured to record sound data of the test object; a sound data time-frequency resolution unit configured to resolve the recorded sound data of the test object into multiple frequency bands by time unit; a correlation coefficient calculation unit configured to compare the sound data resolved into multiple frequency bands by time unit among the multiple frequency bands and calculate correlation coefficients indicating strength of correlation between the multiple frequency bands; and an abnormal sound determination unit configured to determine presence/absence of the abnormal sound occurrence based on the calculated correlation coefficients.

In order to achieve the object, this invention provides in its second aspect a method for determining presence/absence of abnormal sound occurrence in a test object, comprising the steps of: a test sound data recording step configured to record sound data of the test object; a sound data time-frequency resolution step configured to resolve the recorded sound data of the test object into multiple frequency bands by time unit; a correlation coefficient calculation step configured to compare the sound data resolved into multiple frequency bands by time unit among the multiple frequency bands and calculate correlation coefficients indicating strength of correlation between the multiple frequency bands; and an abnormal sound determination step configured to determine presence/absence of the abnormal sound occurrence based on the calculated correlation coefficients.

In order to achieve the object, this invention provides in its third aspect an apparatus for determining presence/absence of abnormal sound occurrence in a test object, comprising: an electronic control unit constituted of a microcomputer equipped with at least one processor and at least one memory coupled to the processor; wherein the processor is configured to: record sound data of the test object; resolve the recorded sound data of the test object into multiple frequency bands by time unit; compare the sound data resolved into multiple frequency bands by time unit among the multiple frequency bands and calculate correlation coefficients indicating strength of correlation between the multiple frequency bands; and determine presence/absence of the abnormal sound occurrence based on the calculated correlation coefficients.

BRIEF DESCRIPTION OF THE DRAWINGS

The objects and advantages of the present invention will become clearer from the following description of embodiments in relation to the attached drawings, in which.

DETAILED DESCRIPTION OF THE INVENTION

In the following, the abnormal sound determination apparatus and determination method according to an embodiment of this invention are explained with reference to the attached drawings.

Figure 1:
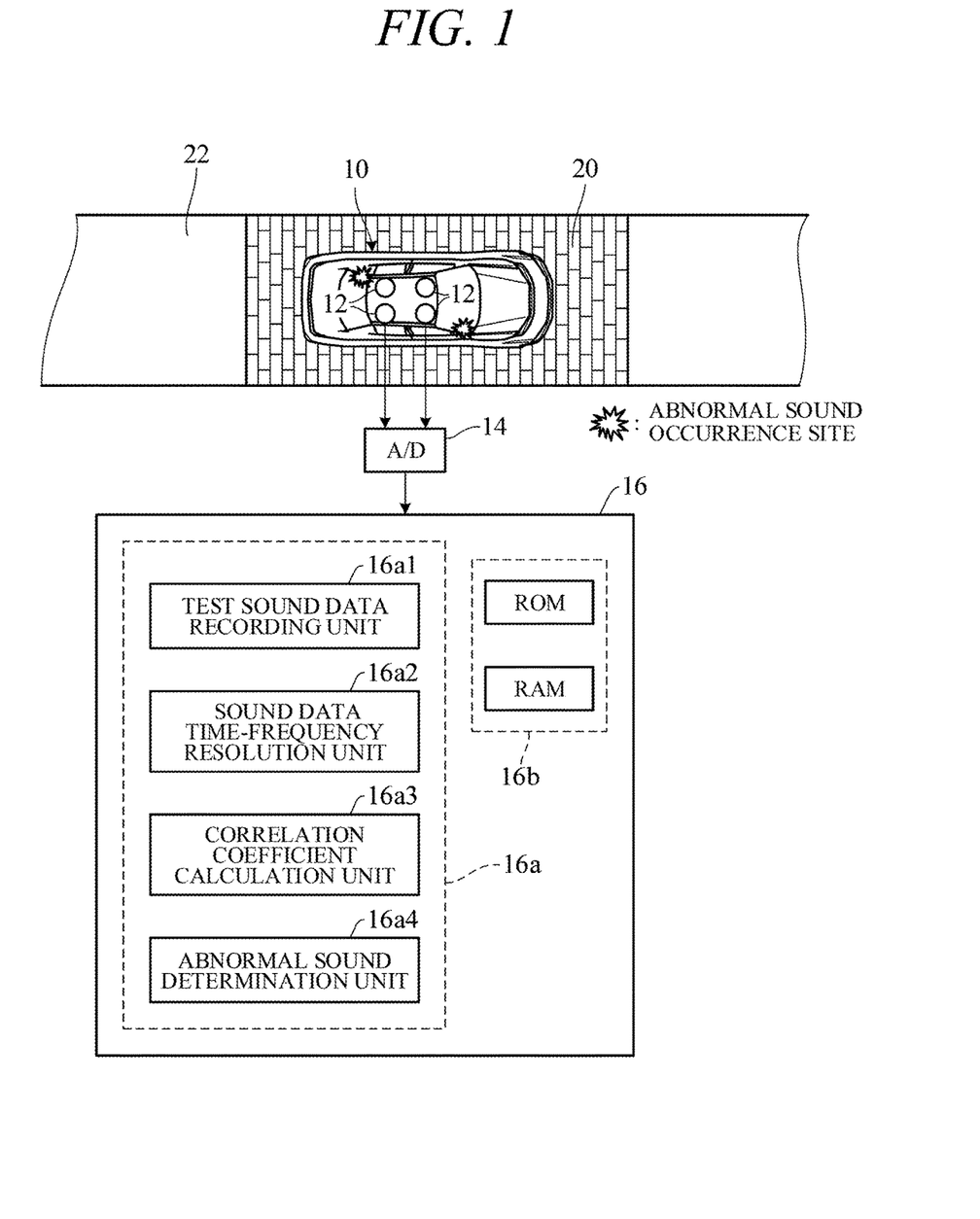
FIG. 1 is a schematic diagram generally illustrating an abnormal sound determination apparatus according to an embodiment of this invention.

FIG. 1 is a schematic diagram generally illustrating an abnormal sound determination apparatus according to this embodiment.

As shown in the drawing, the abnormal sound determination apparatus, which is installed in a vehicle (test object) 10, specifically in a passenger compartment (interior) of the vehicle 10 immediately after completion of assembly at a manufacturing plant, has four microphones 12, an A/D conversion circuit 14 configured to A/D-convert each of four channel sound signals outputted from the microphones 12 to a digital signal, and an electronic control unit (ECU) 16 that receives output from the A/D conversion circuit 14 as input.

In this embodiment, when an inspector drives the vehicle 10 on a predetermined test track 22 including a Belgian block (cobblestone) road or other such rough road 20, interior noise caused by forced vibration of the vehicle frame is picked up by the microphones 12, A/D converted by the A/D conversion circuit 14, and inputted to the ECU 16 as sound data that automatically determines (inspects) whether abnormal sound different from interior noise during normal running occurs. An "abnormal sound occurrence site" is indicated in FIG. 1 as one example.

Since abnormal sound determination can be performed regardless of how the vehicle is forcibly vibrated, the determination can be alternatively performed by vibrating the vehicle 10 with a mechanical vibrator rather than by actual driving by an inspector.

The A/D conversion circuit 14 and ECU 16 are installed at a suitable location, such as in the interior (passenger compartment) of the vehicle 10. The ECU 16 is configured as a microcomputer comprising at least one processor (CPU) 16a, and at least one memory 16b such as ROM, RAM and other memory coupled to the processor 16a.

As shown in FIG. 1, an abnormal sound determination apparatus for determining presence/absence of abnormal sound occurrence in a test object (object to be tested; i.e., vehicle 10) comprises a processor 16a that operates in accordance with a program stored in the memory 16b so as to function as a test sound data recording unit (more precisely a test object sound data recording unit) 16a1, a sound data time-frequency resolution unit 16a2, a correlation coefficient calculation unit 16a3, and an abnormal sound determination unit 16a4.

As stated earlier, "abnormal sound" as termed here means any of various kinds of noise that differ from interior noise during normal sound vehicle running, i.e., differ from engine sound, wind sound, road noise and other interior noises heard during normal sound vehicle running, and that are noises that normally should not occur in a properly assembled vehicle, such as detached bolt and other rolling sounds, squeaking, and loose connector rattling.

The test sound data recording unit 16a1 uses the microphones 12 to record sound data of the test object (vehicle 10) over a predetermined time period (e.g., 30 [s]). The sound data time-frequency resolution unit 16a2 resolves recorded sound data of the test object into multiple frequency bands by time unit.

The correlation coefficient calculation unit 16a3 compares sound data resolved into multiple frequency bands by time unit among the multiple frequency bands and calculates correlation coefficients indicating strength of correlation therebetween. The abnormal sound determination unit 16a4 determines presence/absence of abnormal sound occurrence based on the calculated correlation coefficients.

Figure 2:
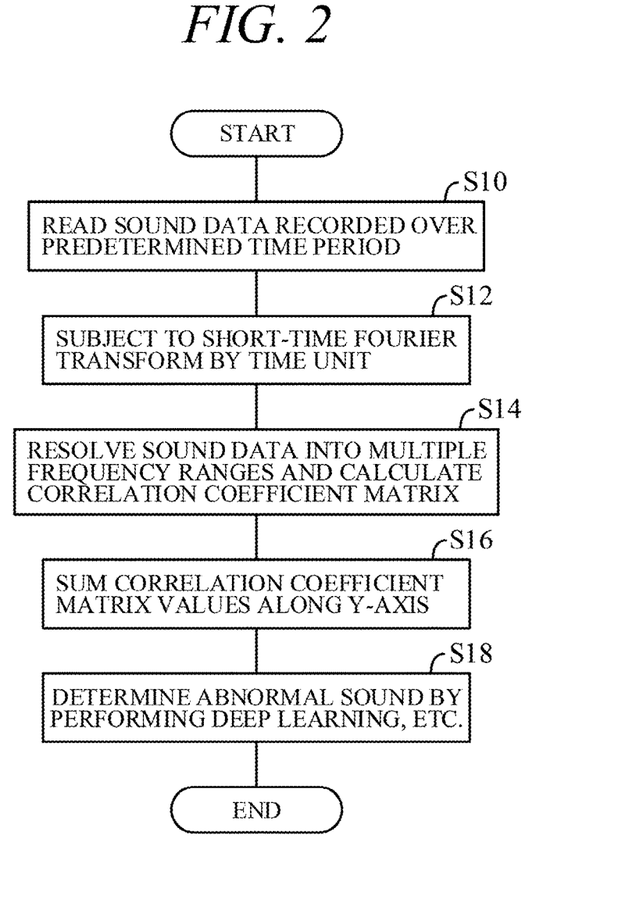
FIG. 2 is a flowchart showing operation of the abnormal sound determination apparatus of FIG. 1.

FIG. 2 is a flowchart showing operation of the abnormal sound determination apparatus of this embodiment in detail, namely, the aforesaid operation of the test sound data recording unit 16a1 etc. of the ECU 16 in further detail.

Now to explain, in S10, data of sound arising from the test object (vehicle 10) in a certain frequency range (e.g., frequencies ranging from 0 to 5,200 [Hz]) recorded through the microphones 12 over a predetermined time period (e.g. 30 [s]) is read.

Figure 3:
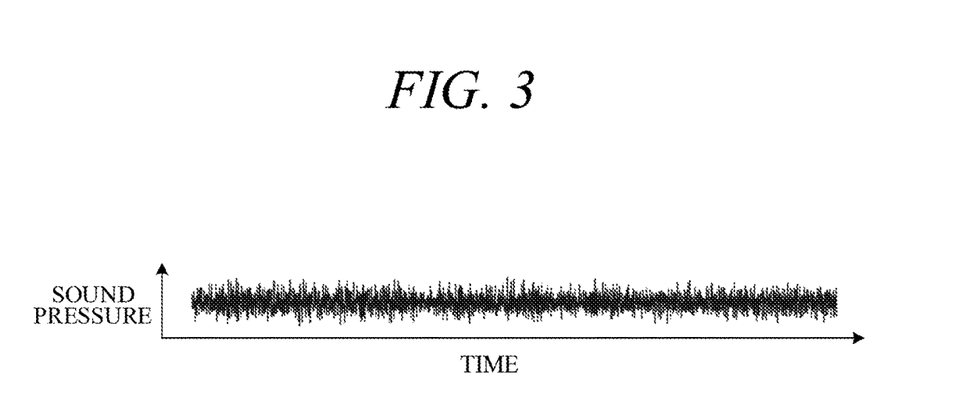
FIG. 3 is an explanatory diagram showing sound data of the test object of FIG. 1 recorded over a predetermined time period.

More specifically, sound data of the test object recorded over the predetermined time period and stored in a suitable region of RAM of the memory 16b is read (S: processing step). The sound data are shown in FIG. 3. Vertical axis in the drawing is scaled for sound pressure [db] and horizontal axis for time [s].

Figures 4A, 4B:
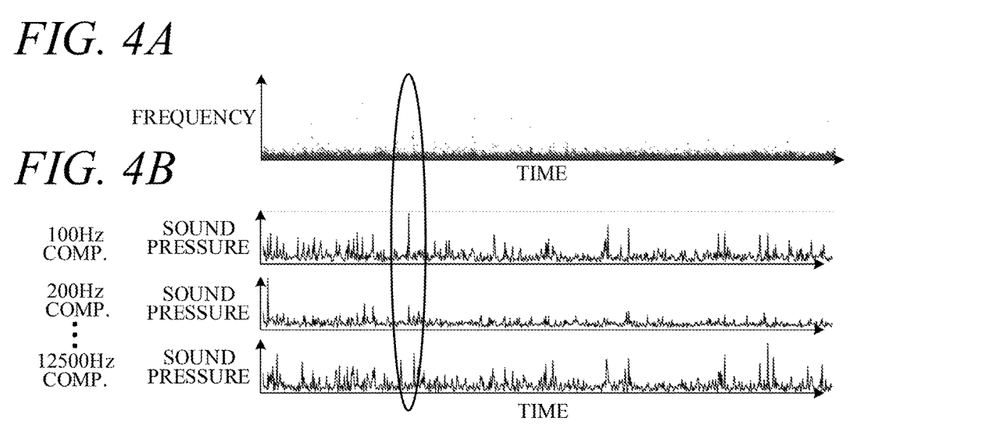
FIG. 4A to 4D are a set of explanatory diagrams showing sound data of FIG. 3 transformed by short-time Fourier transform (STFT), the same decomposed into multiple frequency bands, and a correlation matrix thereof.

Next, in S12, the recorded sound data are subjected to short-time Fourier transform (STFT) by time unit (e.g., 1 [s]). Data transformed by STFT are shown in FIG. 4A. Vertical axis in the drawing is scaled for frequency [Hz] and horizontal axis for time [s].

Next, in S14, sound data subjected to STFT by time unit is resolved into multiple frequency ranges, more exactly, by time unit into 100 [Hz] ranges, compared among the multiple frequency ranges, correlation coefficients representing strength of correlation between pairs thereof are calculated, and a correlation coefficient matrix is calculated from the calculated correlation coefficients.

Figure 4C:
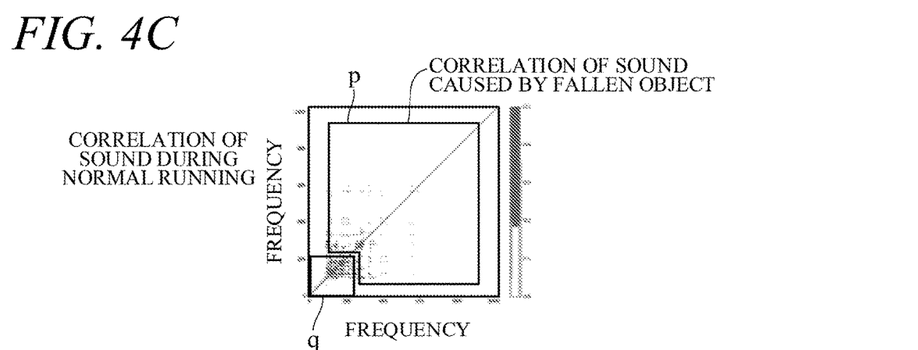
Figure 4D:
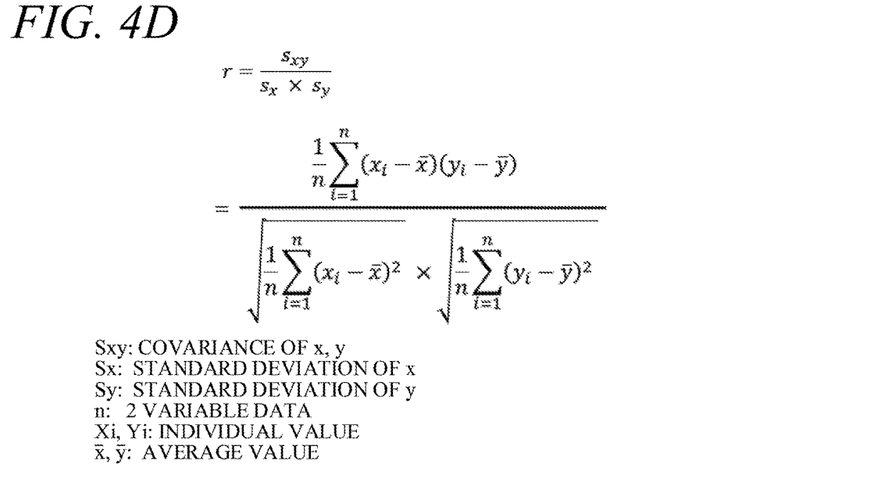

FIG. 4B shows sound data resolved into multiple frequency ranges (of 100 [Hz]). In each of the frequency ranges of FIG. 4B, vertical axis is scaled for sound pressure [db] and horizontal axis for time [s]. A correlation coefficient matrix of these variables is shown in FIG. 4C. The correlation coefficient matrix represents correlation between pairs of frequencies. FIG. 4D shows the calculation formula.

In concrete terms, the processing of S14 comprises of comparing 100 Hz component and 200 Hz component, next comparing 100 Hz component and 300 Hz component, . . . comparing 200 Hz component and 100 Hz component, . . . comparing 300 Hz component and . . . and so on to sequentially compare 1,024 pairs of frequency components from 100 Hz component to 12,500 Hz component, thereby sequentially calculating correlation coefficients and a correlation coefficient matrix.

Figure 5:
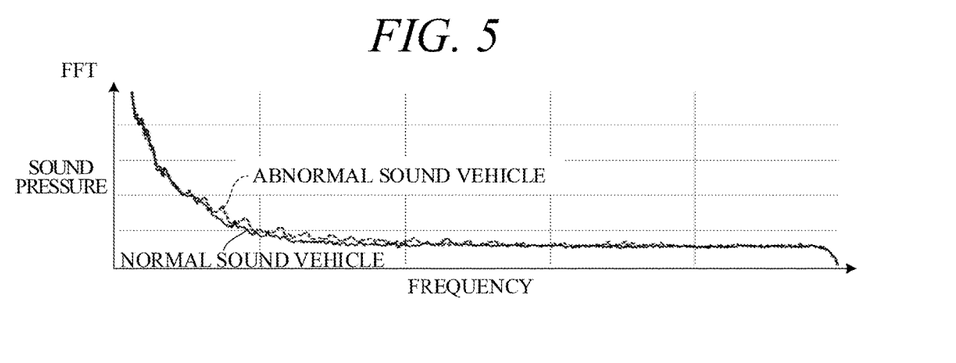
FIG. 5 is an explanatory diagram showing recorded sound data of the test object of FIG. 1 transformed by fast Fourier transform (FFT).
Figure 6:
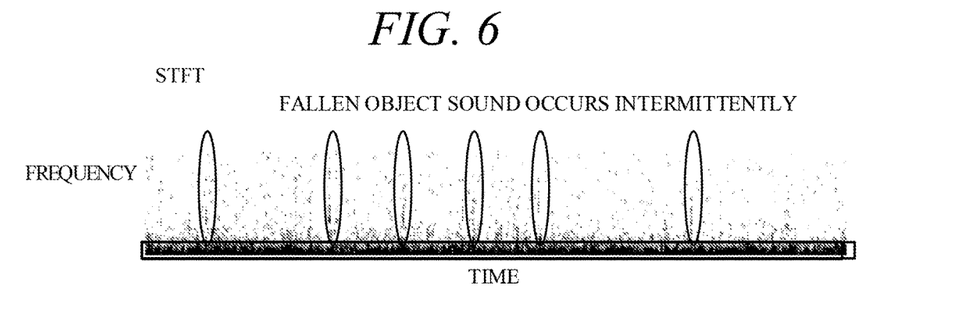
FIG. 6 is an explanatory diagram showing recorded sound data of the test object of FIG. 1 transformed by sort-time Fourier transform.

The reason for performing the processing from S12 to S14 will be explained referring to FIGS. 5 and 6. FIG. 5 is an explanatory diagram showing data when ordinary fast Fourier transform (FFT) is performed with respect to recorded sound data, and FIG. 6 is an explanatory diagram showing data when time-limited short-time Fourier transform (STFT) is performed with respect to recorded sound data.

As shown in FIG. 5, when ordinary FFT is used, sound pressure difference between a normal sound vehicle and an abnormal sound vehicle does not appear saliently. An abnormal sound is particularly apt to occur intermittently when, for example, it is a sound component of a fallen object (such as stray bolt rolling sound). Moreover, since road and other noise during normal running is quite large, abnormal sound components are small in comparison.

By applying his knowledge and experience and focusing on his observation that abnormal sound caused by specified sound sources, such as fallen objects, manifest correlation in every frequency component, the inventor achieved this invention based on the thinking that solely abnormal sound components can be accurately extracted by resolving recorded test sound data into multiple frequency bands by time unit, comparing the resolved sound data among the multiple frequency bands, calculating correlation coefficients (matrix) indicating strength of correlation therebetween, and determining presence/absence of abnormal sound occurrence based on the calculated correlation coefficients (matrix).

Namely, the inventor focused on his observation that since, as shown at FIG. 4A, FIG. 4B and FIG. 4C, abnormal sound caused by a specified sound source such as a fallen object exhibits strong correlation in multiple frequency bands, abnormal sound components can be solely extracted by calculating correlation coefficients (matrix) representing strength of their correlation.

Medium-high-frequency domain designated by symbol p in the correlation coefficient matrix mainly includes correlation with sound attributable to fallen object, while low-frequency domain designated by symbol q mainly includes correlation with sound attributable to normal running noise.

Figure 7:
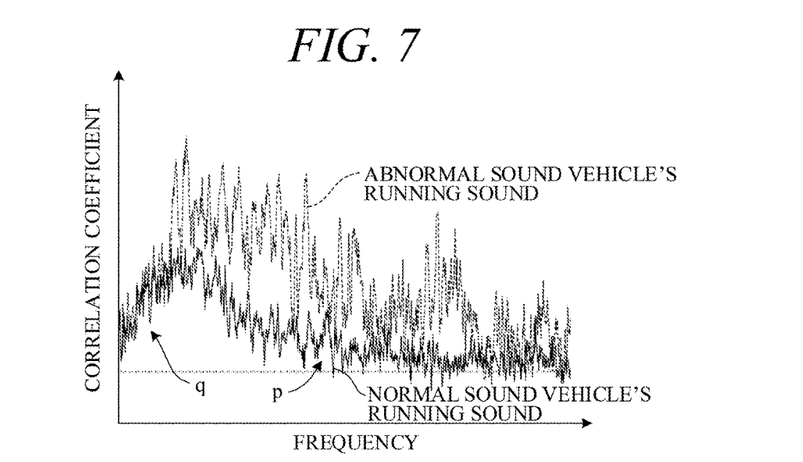
FIG. 7 is an explanatory diagram showing total value of the correlation matrix of FIG. 4.

Returning to the flowchart of FIG. 2, next, in S16, obtained correlation coefficients (more exactly correlation coefficient matrix values) are summed along y-axis. FIG. 7 is an explanatory diagram showing obtained sums against frequency. In FIG. 7, vertical axis is scaled for correlation coefficient and horizontal axis for frequency.

Next, in S18, presence/absence of abnormal sound occurrence is determined by performing deep learning or other mechanical learning based on y-axis distribution of correlation coefficients (more specifically, correlation coefficient matrix) calculated in S16, more exactly on total value of correlation coefficient matrix.

As set out in the foregoing, the inventor learned that with respect to abnormal sound attributable to specified sound sources, abnormal sound components enlarge correlation coefficient value in the case where recorded test sound data is resolved into multiple frequency bands by time unit, the resolved sound data is compared among the multiple frequency bands, and correlation between pairs thereof is calculated. The fact of correlation coefficient value becoming greater therefore enables determination of abnormal sound component having been extracted, i.e., of abnormal sound being present.

On the other hand, as there is a risk of correlation coefficients being calculated owing to transient noise or the like, determination of presence/absence of abnormal sound is not limited to that by calculating correlation coefficients and, in addition, whether total calculated correlation coefficient value exceeds a suitably defined threshold value is determined and presence/absence of abnormal sound is determined when the total value exceeds the threshold value.

Abnormal sound frequency characteristics indicated by symbols p and q of FIG. 4C are explained with reference to FIG. 7 below.

FIG. 7 is an explanatory diagram comparing correlation coefficient matrix total value of abnormal sound vehicle running sound and normal sound vehicle running sound. Although accuracy of abnormal sound presence/absence determination is somewhat low in the low-frequency range indicated by symbol q in FIG. 7 because it is a range mixed with noise occurring during normal sound vehicle running, abnormal sound components can be seen to be accurately extracted in the medium-high frequency domain p thereabove thanks to the aforesaid processing.

Figure 8A:
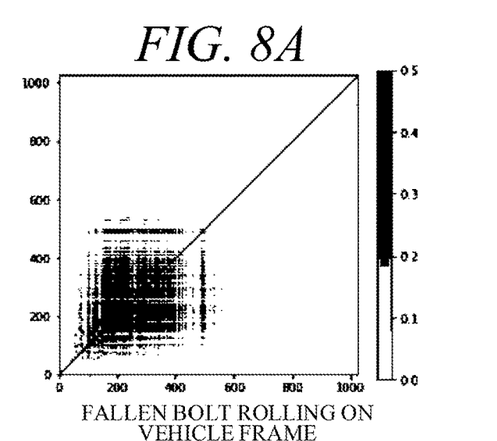
FIG. 8A to 8C are a set of explanatory diagrams showing correlation matrices regarding three kinds of abnormal sound.
Figure 8B:
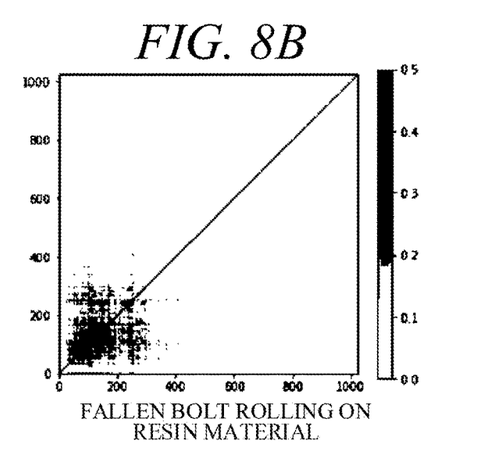
Figure 8C:
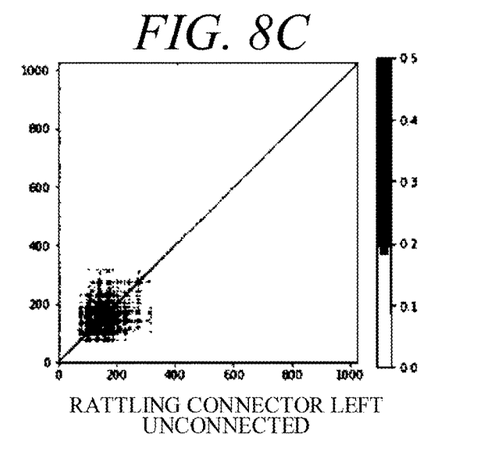

In explaining determination or discrimination of different types of abnormal sound, attention is given to the point that abnormal sounds are the result of numerous and diverse causes. FIG. 8A to 8C show correlation coefficient matrices with respect to three types of abnormal sound, including explanatory diagrams showing correlation coefficient matrices, taking as examples abnormal sound from a fallen bolt rolling on vehicle frame in FIG. 8A, from a fallen bolt rolling on a resin material in FIG. 8B, and from a rattling connector left unconnected in FIG. 8C.

Figure 9:
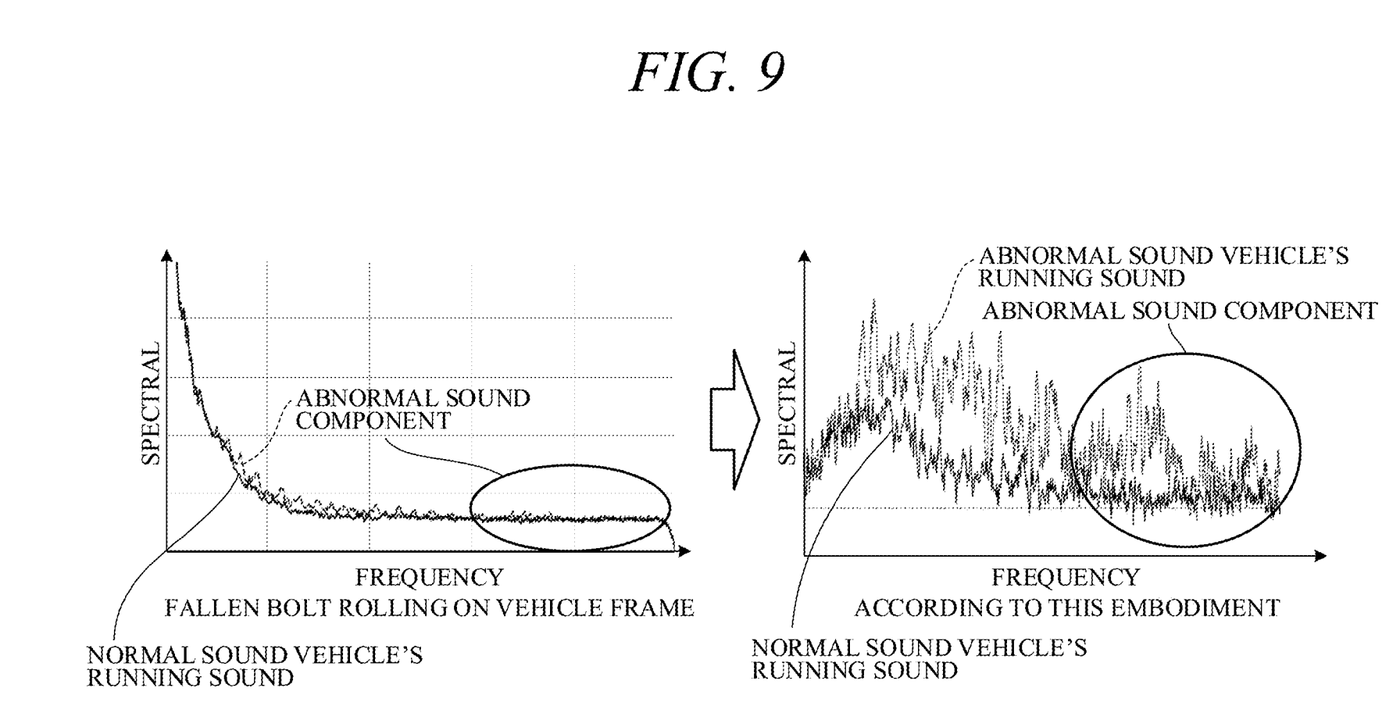
FIG. 9 is an explanatory diagram similar to FIG. 7, contrasting cases of performing and not performing proposed method with respect to, among abnormal sounds, rolling sound of stray bolt fallen onto vehicle frame.
Figure 10:
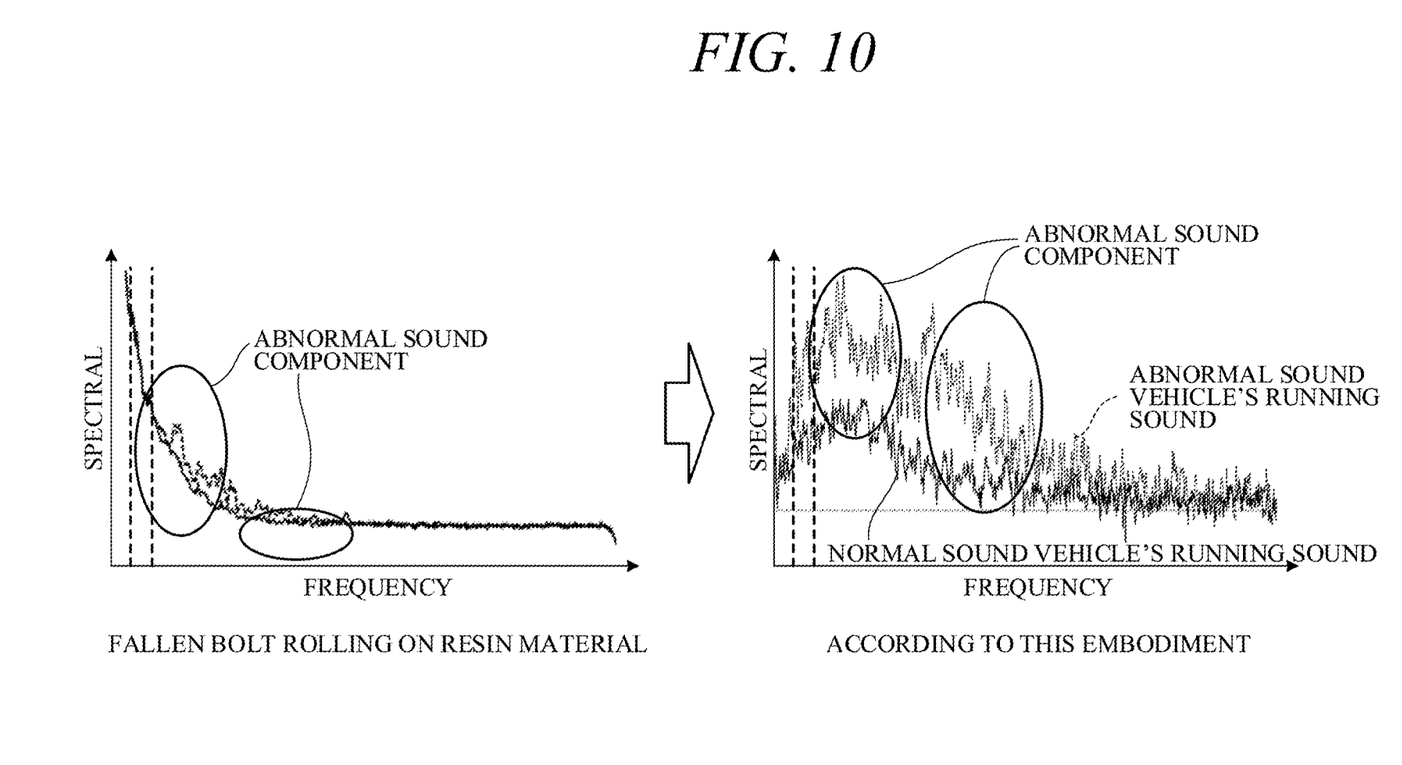
FIG. 10 is an explanatory diagram similar to FIG. 9, contrasting cases of performing and not performing proposed method with respect to, among abnormal sounds, rolling sound of stray bolt fallen onto resin material.

FIGS. 9 and 10 are explanatory diagrams comparing, among these, rolling sound of bolt fallen onto frame and rolling sound of bolt fallen onto resin material. Measured data showing frequency spectral characteristics are shown on the left sides of FIG. 9 and FIG. 10 for cases in which processing by the aforesaid proposed method was not performed and on the right sides thereof for cases in which the processing by the proposed method was performed. In these drawings, solid lines indicate normal sound vehicle running sound and broken lines indicate abnormal sound vehicle running sound (abnormal sound components). It can be seen from these drawings that the proposed method accurately extracts abnormal sound components.

As stated in the foregoing, this embodiment is configured to have an abnormal sound determination apparatus (or abnormal sound determination method) for determining presence/absence of abnormal sound occurrence in a test object (vehicle 10), which (abnormal sound determination apparatus and abnormal sound determination method) comprises: a test (test object) sound data recording unit (16a1) or a test sound data recording steps (S10, S12) configured to record sound data of the test object; a sound data time-frequency resolution unit (16a2) or the sound data time-frequency resolution step (S14) configured to resolve the recorded sound data of the test object into multiple frequency bands by time unit; a correlation coefficient calculation unit (16a3) or correlation coefficient calculating step (S14) configured to compare the sound data resolved into multiple frequency bands by time unit among the multiple frequency bands and calculate correlation coefficients indicating strength of correlation between the multiple frequency bands; and an abnormal sound determination unit (16a4) or abnormal sound determination steps (S16, S18) configured to determine presence/absence of the abnormal sound occurrence based on the calculated correlation coefficients.

Thus, insofar as abnormal sound to be determined is abnormal sound attributable to a specified sound source, occurrence or nonoccurrence thereof, including unknown abnormal sound, in a test object can be accurately determined, without preselecting proper frequency components, by resolving recorded test object sound data into multiple frequency bands by time unit, comparing the resolved sound data among the multiple frequency bands, calculating correlation coefficients indicating strength of correlation between the multiple frequency bands, and determining presence/absence of abnormal sound occurrence based on the calculated correlation coefficients.

Moreover, the fact that determination is possible solely from running sound of the test object precludes the need to prerecord normal vehicle running sound as reference sound with respect to the test object, so that the abnormal sound determination apparatus (or abnormal sound determination method) is particularly advantageous when many types of test object are tested or inspected.

Further, the abnormal sound determination unit (16a4) (or abnormal sound determination steps (S16, S18)) is configured to calculate correlation coefficient matrices of every frequency band from the calculated correlation coefficients and to determine presence/absence of the abnormal sound occurrence based on the calculated correlation coefficient matrices, whereby, in addition to realizing the aforesaid effects, determination of presence/absence of abnormal sound using correlation coefficients can be easily achieved.

Further, the abnormal sound determination unit (16a4) (or abnormal sound determination steps (S16, S18)) is configured to determine type of the abnormal sound based on the calculated correlation coefficient matrices, whereby, in addition to realizing the aforesaid effects, countermeasures, including diagnosis of abnormal sound cause, repair and the like, can be readily implemented after determination of abnormal sound occurrence.

Moreover, the abnormal sound determination unit (16a4) (or abnormal sound determination steps (S16, S18)) is configured to determine presence/absence of the abnormal sound occurrence by summing the calculated correlation coefficients, whereby, in addition to realizing the aforesaid effects, values obtained by the summing, for example, are strengthened against data variance by, for example, comparison with a suitably designed threshold value, thereby increasing possibility of calculation cost reduction by dimension reduction when using machine learning in determination threshold value, and in turn enabling more accurate determination of presence/absence of abnormal sound.

Moreover, the abnormal sound determination unit (16a4) (or abnormal sound determination steps (S16, S18)) is configured to determine presence/absence of the abnormal sound occurrence based on the calculated correlation coefficients when total value of the calculated correlation coefficients exceeds a threshold value, whereby, in addition to realizing the aforesaid effects, effect of transient noise and the like can be eliminated.

Moreover, the abnormal sound determination apparatus comprises an electronic control unit (ECU) configured as a microcomputer comprising at least one processor (CPU) 16a, and at least one memory (ROM, RAM and other memory) 16b coupled to the processor 16a, and the processor 16a is configured to record sound data of the test object (S10, S12), resolve the recorded sound data into multiple frequency bands by time unit (S14), compare the sound data resolved into multiple frequency bands by time unit among the multiple frequency bands, calculate correlation coefficients indicating strength of correlation between the multiple frequency bands (S14), and determine presence/absence of the abnormal sound occurrence based on the calculated correlation coefficients (S16, S18).

Although the foregoing description relates to a case of using STFT to perform sound data time time-frequency resolution, this is not a limitation, and wavelet conversion or any other method capable of data time-frequency resolution can be adopted instead.

While the present invention has been described with reference to the preferred embodiments thereof, it will be understood, by those skilled in the art, that various changes and modifications may be made without departing from the scope of the appended claims.

What is claimed is:

1. An apparatus for determining presence/absence of abnormal sound occurrence in a test object, comprising:
   a test sound data recording unit configured to record sound data of the test object;
   a sound data time-frequency resolution unit configured to resolve the recorded sound data of the test object into multiple frequency bands by time unit;
   a correlation coefficient calculation unit configured to compare the sound data resolved into multiple frequency bands by time unit among the multiple frequency bands and calculate correlation coefficients indicating strength of correlation between the multiple frequency bands; and
   an abnormal sound determination unit configured to determine presence/absence of the abnormal sound occurrence based on the calculated correlation coefficients.

2. The apparatus according to claim 1, wherein the abnormal sound determination unit is configured to calculate correlation coefficient matrices of every frequency band from the calculated correlation coefficients and to determine presence/absence of the abnormal sound occurrence based on the calculated correlation coefficient matrices.

3. The apparatus according to claim 2, wherein the abnormal sound determination unit is configured to determine type of the abnormal sound based on the calculated correlation coefficient matrices.

4. The apparatus according to claim 1, wherein the abnormal sound determination unit is configured to determine presence/absence of the abnormal sound occurrence by summing the calculated correlation coefficients.

5. The apparatus according to claim 4, wherein the abnormal sound determination unit is configured to determine presence/absence of the abnormal sound occurrence based on the calculated correlation coefficients when total value of the calculated correlation coefficients exceeds a threshold value.

6. The apparatus according to claim 1, wherein the test object is a vehicle.

7. A method for determining presence/absence of abnormal sound occurrence in a test object, comprising the steps of:
   recording sound data of the test object;
   resolving the recorded sound data of the test object into multiple frequency bands by time unit;
   comparing the sound data resolved into multiple frequency bands by time unit among the multiple frequency bands and calculating correlation coefficients indicating strength of correlation between the multiple frequency bands; and
   determining presence/absence of the abnormal sound occurrence based on the calculated correlation coefficients.

8. The method according to claim 7, wherein the abnormal sound determination step is configured to calculate correlation coefficient matrices of every frequency band from the calculated correlation coefficients and to determine presence/absence of the abnormal sound occurrence based on the calculated correlation coefficient matrices.

9. The method according to claim 8, wherein the abnormal sound determination step is configured to determine type of the abnormal sound based on the calculated correlation coefficient matrices.

10. The method according to claim 7, wherein the abnormal sound determination step is configured to determine presence/absence of the abnormal sound occurrence by summing the calculated correlation coefficients.

11. The method according to claim 10, wherein the abnormal sound determination step is configured to determine presence/absence of the abnormal sound occurrence based on the calculated correlation coefficients when total value of the calculated correlation coefficients exceeds a threshold value.

12. The method according to claim 7, wherein the test object is a vehicle.

13. An apparatus for determining presence/absence of abnormal sound occurrence in a test object, comprising:
an electronic control unit constituted of a microcomputer equipped with at least one processor and at least one memory coupled to the processor;
wherein the processor is configured to:
record sound data of the test object;
resolve the recorded sound data of the test object into multiple frequency bands by time unit;
compare the sound data resolved into multiple frequency bands by time unit among the multiple frequency bands and calculate correlation coefficients indicating strength of correlation between the multiple frequency bands; and
determine presence/absence of the abnormal sound occurrence based on the calculated correlation coefficients.

14. The apparatus according to claim 13, wherein the processor is configured to calculate correlation coefficient matrices of every frequency band from the calculated correlation coefficients and to determine presence/absence of the abnormal sound occurrence based on the calculated correlation coefficient matrices.

15. The apparatus according to claim 2, wherein the processor is configured to determine type of the abnormal sound based on the calculated correlation coefficient matrices.

16. The apparatus according to claim 1, wherein the processor is configured to determine presence/absence of the abnormal sound occurrence by summing the calculated correlation coefficients.

17. The apparatus according to claim 16, wherein processor is configured to determine presence/absence of the abnormal sound occurrence based on the calculated correlation coefficients when total value of the calculated correlation coefficients exceeds a threshold value.

18. The apparatus according to claim 13, wherein the test object is a vehicle.

* * * * *